(12) United States Patent
Sakamoto et al.

(10) Patent No.: US 8,526,630 B2
(45) Date of Patent: Sep. 3, 2013

(54) ACTIVE SOUND CONTROL APPARATUS

(75) Inventors: Kosuke Sakamoto, Wako (JP); Toshio Inoue, Wako (JP); Akira Takahashi, Wako (JP); Yasunori Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1024 days.

(21) Appl. No.: 12/041,990

(22) Filed: Mar. 4, 2008

(65) Prior Publication Data

US 2008/0310642 A1 Dec. 18, 2008

(30) Foreign Application Priority Data

Mar. 7, 2007 (JP) .................................. 2007-057122

(51) Int. Cl.
*H04B 1/00* (2006.01)
(52) U.S. Cl.
USPC .............................................. 381/86; 381/61
(58) Field of Classification Search
USPC ..................... 381/86, 56–63, 98–109; 700/94
See application file for complete search history.

(56) References Cited

U.S. PATENT DOCUMENTS

| | | | | |
|---|---|---|---|---|
| 4,991,218 A | * | 2/1991 | Kramer | 381/61 |
| 5,692,052 A | * | 11/1997 | Tanaka et al. | 381/71.9 |
| 5,835,605 A | * | 11/1998 | Kunimoto | 381/61 |
| 6,944,303 B2 | * | 9/2005 | Akiho | 381/71.14 |
| 7,062,049 B1 | | 6/2006 | Inoue et al. | |
| 7,352,869 B2 | * | 4/2008 | Inoue et al. | 381/71.11 |
| 7,606,374 B2 | * | 10/2009 | Maeda | 381/61 |
| 2004/0247137 A1 | | 12/2004 | Inoue et al. | |
| 2005/0094826 A1 | * | 5/2005 | Morishita | 381/86 |
| 2006/0215846 A1 | | 9/2006 | Kobayashi et al. | |
| 2008/0310642 A1 | | 12/2008 | Sakamoto et al. | |
| 2009/0028353 A1 | | 1/2009 | Kobayashi et al. | |
| 2009/0052682 A1 | | 2/2009 | Kuroiwa | |

FOREIGN PATENT DOCUMENTS

| | | |
|---|---|---|
| JP | 02-158296 | 6/1990 |
| JP | 2006-298111 | 11/2006 |

OTHER PUBLICATIONS

Co-Pending U.S. Appl. No. 13/761,963, filed Feb. 7, 2013.
Corresponding U.S. Appl. No. 13/761,963, filed Feb. 7, 2013.
Extended European Search Report dated May 27, 2013, EP Application No. 13155052.7, 4 pages.

\* cited by examiner

*Primary Examiner* — Vivian Chin
*Assistant Examiner* — Fatimat O Olaniran
(74) *Attorney, Agent, or Firm* — Rankin, Hill & Clark LLP

(57) ABSTRACT

An active sound control apparatus includes a delay circuit for delaying the output of a frequency component of a sound effect by delaying an engine rotation frequency signal representative of an engine rotation frequency [Hz], a delay circuit for delaying the output of an amplitude component of the sound effect by delaying an engine rotation frequency change signal representative of an engine rotation frequency change [Hz/second], and delay circuits for delaying the output of all components of the sound effect by delaying a control signal for controlling the outputs of speakers.

6 Claims, 16 Drawing Sheets

ACTIVE SOUND CONTROL APPARATUS

BACKGROUND OF THE INVENTION

1. Field of the Invention

The present invention relates to an active sound control apparatus for generating a sound effect based on a vibratory noise source signal representative of information of a running state of a vehicle or an operating state of an engine.

2. Description of the Related Art

There has been known an active sound control apparatus (hereinafter referred to as "ASC apparatus") as one of the apparatus for controlling the acoustic properties in a vehicle's passenger compartment in relation to noise therein.

The ASC apparatus generates a sound effect in synchronism with the noise to increase the acoustic effect in the passenger compartment by highlighting a change in the speed of the vehicle. Specifically, the ASC apparatus outputs a sound effect from speakers for creating a live sound atmosphere in the passenger compartment, using control parameters including the degree of a reference signal of harmonics based on an engine rotational speed [rpm], the engine rotational speed, a vehicle speed change [km/hour/second], etc (see, for example, U.S. Patent Application Publication No. 2006/0215846).

However, the invention of U.S. Patent Application Publication No. 2006/0215846 still remains to be improved for enhancing the live sound atmosphere in the passenger compartment.

SUMMARY OF THE INVENTION

It is an object of the present invention to provide an active sound control apparatus which is capable of creating a live sound atmosphere in a vehicle's passenger compartment.

According to the present invention, an active sound control apparatus (hereinafter also referred to as "ASC apparatus") for generating a sound effect based on a vibratory noise source signal representative of information of a running state of a vehicle or an operating state of an engine includes a delay circuit for adding a delay to the output of at least one component of the sound effect.

According to the present invention, it is possible to add a delay to the output of at least one component of the sound effect. Therefore, the output of the sound effect can be controlled in a wider range for creating a live sound atmosphere in the passenger compartment.

The vibratory noise source signal may comprise a signal representative of an engine rotation frequency [Hz] (60 times an engine rotational speed [rpm]), a signal representative of a vehicle speed [km/hour], or a signal representative of an actual engine sound obtained through a microphone.

The components of the sound effect include a frequency component and an amplitude component thereof.

If the vibratory noise source signal is a signal representative of an engine rotation frequency, then the delay circuit preferably adds a delay to the output of a frequency component of the sound effect by delaying the signal representative of the engine rotation frequency.

When the signal representative of the engine rotation frequency is delayed, the frequency of the actual engine sound and the frequency of the sound effect are caused to differ from each other. The frequency difference causes a passenger at a passenger position, to which the sound effect is to be output, to sense a beat resulting from the actual engine sound and the sound effect, so that a live sound atmosphere in the passenger compartment is created.

The active sound control apparatus preferably further comprises reference signal generators for generating a plurality of reference signals of harmonics having different degrees based on the signal representative of the engine rotation frequency, and the delay circuit preferably adds a delay to the output of the frequency component of the sound effect by delaying the signal representative of the engine rotation frequency per reference signal.

It is thus possible to set a delay for the output of the frequency component of the sound effect corresponding to the engine rotation frequency per reference signal for controlling the output of the sound effect in greater detail.

If the vibratory noise source signal comprises a signal representative of an engine rotation frequency, then the active sound control apparatus preferably further adjusts an amplitude component of the sound effect depending on a signal representative of a change per unit time in the engine rotation frequency (hereinafter also referred to as "engine rotation frequency change" or "change"), and the delay circuit preferably adds a delay to the output of the amplitude component of the sound effect by delaying the signal representative of the engine rotation frequency change.

With the above arrangement, a delay is added to the output of the amplitude component of the sound effect by delaying the signal representative of the engine rotation frequency change. Therefore, when the output of the amplitude component of the sound effect is delayed with respect to the output of the amplitude component of the actual engine sound, for example, the passenger at the passenger position, to which the sound effect is to be output, is allowed to sense a sound reverberation, so that a live sound atmosphere in the passenger compartment is created.

On the other hand, in the active sound control apparatus, the delay circuit may add a delay to the output of the amplitude component of the sound effect by delaying the signal representative of the engine rotation frequency change per reference signal.

It is thus possible to set a delay for the output of the amplitude component of the sound effect corresponding to the engine rotation frequency change per reference signal, for controlling the output of the sound effect in greater detail.

The delay circuit may add a delay to the output of all components of the sound effect, including the frequency component and the amplitude component.

Therefore, the sound effect reaches the passenger position, to which the sound effect is to be output, with a delay from the actual engine sound. The passenger at the passenger position senses as if the engine, as a vibratory noise source, is moving, so that a live sound atmosphere in the passenger compartment is created.

The active sound control apparatus may further comprise a plurality of output units for outputting the sound effect, and the delay circuit may add a delay to the output of all the components of the sound effect with respect to each of the output units. The passenger at the passenger position is thus more easily capable of sensing as if the vibratory noise source is moving, so that the live sound atmosphere in the passenger compartment is enhanced.

The delay circuit may vary the delay based on the vibratory noise source signal. Consequently, conditions for generating a delay may be established and the extent of the delay may be varied. It is thus possible to generate a delay depending on the situation in the vehicle.

According to the present invention, as described above, it is possible to add a delay to the output of at least one component of the sound effect. Therefore, the output of the sound effect can be controlled in a wider range for enhancing the live sound atmosphere in the passenger compartment.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
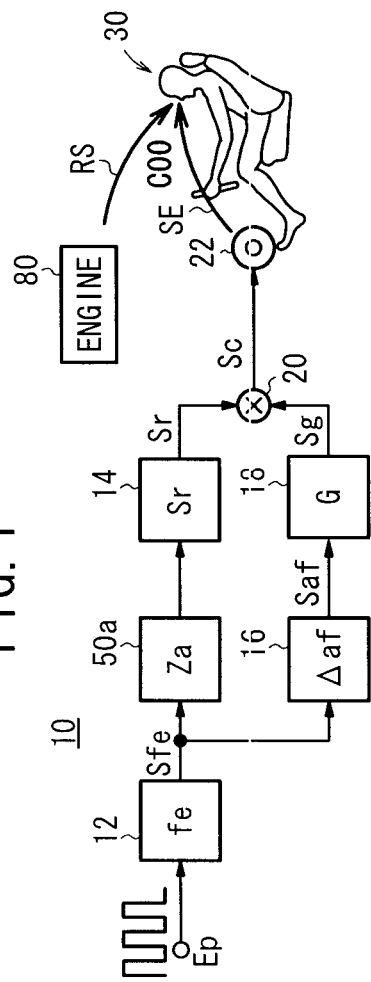
FIG. 1 is a block diagram showing a general functional arrangement of an active sound control apparatus according to the first embodiment of the present invention.

Active sound control apparatus according to preferred embodiments of the present invention will be described below with reference to the drawings. Like or corresponding parts are denoted by like or corresponding reference characters throughout views.

A. First Embodiment

(1) Overview of the First Embodiment

An active sound control apparatus 10 (hereafter referred to as "ASC apparatus 10") according to the first embodiment of the present invention shown in FIG. 1 brings the sound pressure level (the output of an amplitude component) of a sound effect SE at each point of time into agreement with the sound pressure level of an actual engine sound RS, and at the same time delays the output of a frequency component of the sound effect SE which corresponds to an engine rotation frequency fe [Hz].

(2) Mechanism for Generating the Sound Effect

FIG. 1 is a block diagram showing a general functional arrangement of the ASC apparatus 10 according to the first embodiment. The ASC apparatus 10 comprises an engine rotation frequency detecting circuit 12 (hereinafter also referred to as "detecting circuit 12"), a reference signal generating circuit 14, an engine rotation frequency change calculating circuit 16 (hereinafter also referred to as "calculating circuit 16"), a gain determining circuit 18, a multiplier 20, a speaker 22, and a delay circuit 50 (50a).

The ASC apparatus 10 performs the following processing sequence: The detecting circuit 12 detects an engine rotation frequency fe [Hz] from engine pulses Ep generated by an engine 80 and generates an engine rotation frequency signal Sfe (hereinafter referred to as "signal Sfe") representative of the engine rotation frequency fe. The reference signal generating circuit 14 generates a reference signal Sr of sine-wave harmonics based on the signal Sfe and the waveform data stored in a waveform data table, not shown. At the same time, the engine rotation frequency change calculating circuit 16 calculates an engine rotation frequency change Δaf (hereinafter also referred to as "change Δaf") [Hz/second] which represents a change per unit time in the engine rotation frequency fe based on the engine rotation frequency signal Sfe, and generates an engine rotation frequency change signal Saf (hereinafter also referred to as "signal Saf") representing the change Δaf. The gain determining circuit 18 determines a gain G by which the reference signal Sr is to be multiplied based on the signal Saf, and generates a gain signal Sg representing the gain G. The multiplier 20 multiplies the reference signal Sr by the gain G represented by the gain signal Sg, producing a control signal Sc. The control signal produced by the multiplier 20 is converted by a D/A converter, not shown, into an analog control signal Sc, which is supplied to the speaker 22 that outputs a sound effect SE based on the analog control signal Sc.

The above processing sequence can be performed using the technology disclosed in U.S. Patent Application Publication No. 2006/0215846. Specifically, the engine rotation frequency fe may be detected as described in paragraph [0061] of U.S. Patent Application Publication No. 2006/0215846, the reference signal Sr may be generated as described in paragraphs [0066] through [0068] thereof, and the engine rotation frequency change Δaf may be calculated as described in paragraphs [0106] and [0107] thereof. The gain G is determined depending on the engine rotation frequency change Δaf in the same manner as disclosed in U.S. Patent Application Publication No. 2006/0215846. According to the first embodiment, however, the gain G is linearly determined depending on the engine rotation frequency change Δaf.

According to the first embodiment, the delay circuit 50 (50*a*) is connected between the engine rotation frequency detecting circuit 12 and the reference signal generating circuit 14 for adding a delay Za of a predetermined time (e.g., 50 microseconds) to the engine rotation frequency signal Sfe from the detecting circuit 12.

In the description which follows, all delay circuits are referred to as "delay circuit 50" with a suffix using an alphabetical letter representing each delay circuit.

Figure 2A:
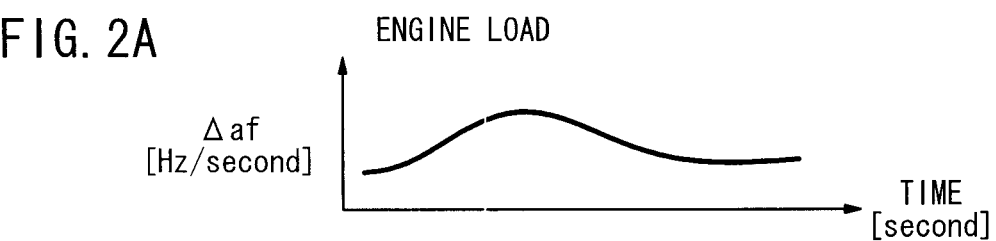
FIG. 2A is a diagram showing an example of an engine load.

(3) Sound Effect Output from the ASC Apparatus 10 According to the First Embodiment According to the first embodiment, the engine rotation frequency signal Sfe to be supplied to the reference signal generating circuit 14 is delayed by the delay circuit 50*a*. However, the engine rotation frequency signal Sfe to be supplied to the engine rotation frequency change calculating circuit 16 is not delayed. In other words, the engine rotation frequency fe which is output is delayed, and the engine rotation frequency change Δaf which is output is not delayed. Therefore, if the engine 80 is under a load as shown in FIG. 2A and the actual engine sound RS is produced by the engine 80 as shown in FIG. 2B, then the sound effect SE is output from the ASC apparatus 10 according to the first embodiment as shown in FIG. 2C.

Figure 2B:
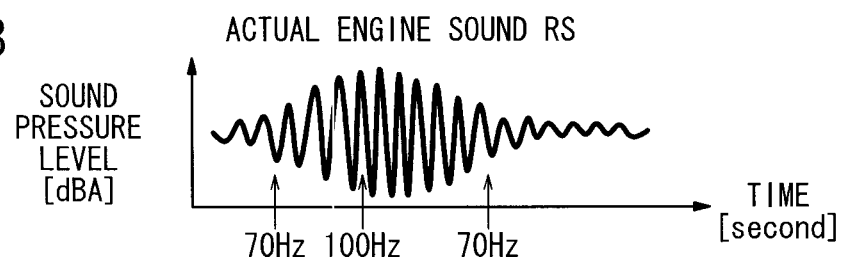
FIG. 2B is a diagram showing the waveform of an actual engine sound corresponding to the engine load shown in FIG. 2A.
Figure 2C:
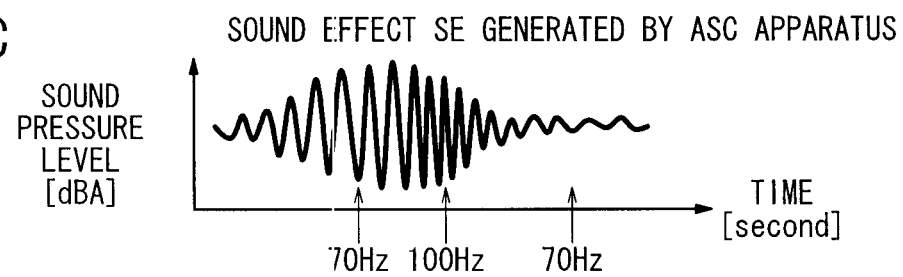
FIG. 2C is a diagram showing the waveform of a sound effect output by the active sound control apparatus shown in FIG. 1 depending on the engine load shown in FIG. 2A.

As can be seen from FIGS. 2B and 2C, the sound pressure level (the output of the amplitude component) of the actual engine sound RS and the sound pressure level of the sound effect SE are in agreement with each other at each point of time. However, the output of the frequency component of the sound effect SE is delayed from the output of the frequency component of the actual engine sound RS by a delay time which is caused by the delay Za set in the delay circuit 50.

Accordingly, if the engine rotation frequency fe is not constant, i.e., if the engine rotation frequency change Δaf is not nil, then the frequency of the actual engine sound RS and the frequency of the sound effect SE are different from each other at the same point of time. The frequency difference causes a passenger at a passenger position 30 to sense a beat resulting from the two sounds, i.e., the actual engine sound RS and the sound effect SE.

(4) Advantages of the First Embodiment

As described above, the ASC apparatus 10 according to the first embodiment generates the sound effect SE based on the engine rotation frequency signal Sfe, and includes the delay circuit 50*a* for adding the delay Za to the output of the frequency component of the sound effect SE.

Since the delay Za is added to the output of the frequency component of the sound effect SE, the output of the sound effect SE can be controlled in a wider range for enhancing a live sound atmosphere in the passenger compartment.

Further, the delay Za added to the engine rotation frequency signal Sfe causes the frequency of the actual engine sound RS and the frequency of the sound effect SE to differ from each other. The frequency difference causes the passenger at the passenger position 30, to which the sound effect SE is to be output, to sense the beat resulting from the actual engine sound RS and the sound effect SE, thereby enhancing the live sound atmosphere in the passenger compartment.

The delay Za added to the engine rotation frequency signal Sfe may be varied depending on the engine rotation frequency change Δaf. For example, the delay time may be increased as the engine rotation frequency change Δaf increases. The delay Za may be added only when the engine rotation frequency change Δaf exceeds a predetermined value (e.g., 5 Hz/second).

B. Second Embodiment

(1) Feature of the Second Embodiment

Figure 3:
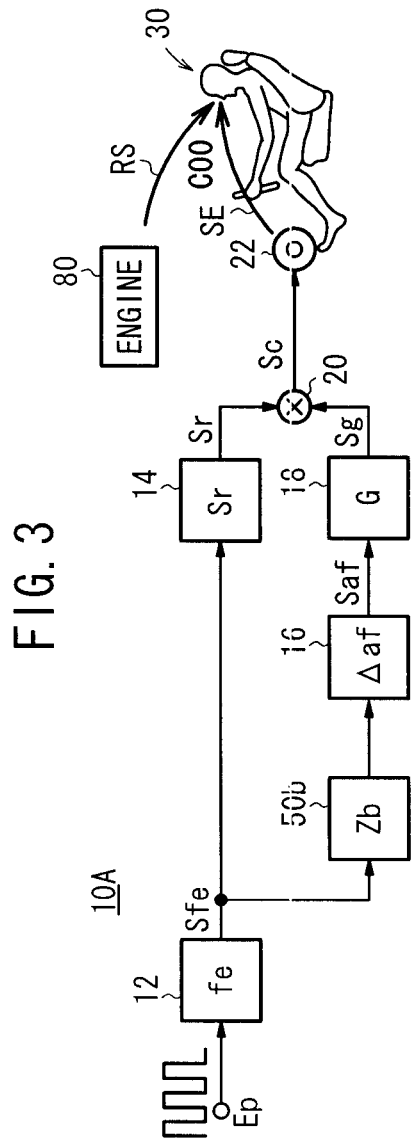
FIG. 3 is a block diagram showing a general functional arrangement of an active sound control apparatus according to the second embodiment of the present invention.

An active sound control apparatus 10A (hereafter referred to as "ASC apparatus 10A") according to the second embodiment of the present invention shown in FIG. 3 resides in that it keeps on outputting the frequency component of the sound effect SE corresponding to the engine rotation frequency fe [Hz], and at the same time delays the sound pressure level (the output of an amplitude component) of the sound effect SE with respect to the sound pressure level of the actual engine sound RS.

(2) Mechanism for Generating the Sound Effect (Differences with the First Embodiment)

FIG. 3 is a block diagram showing a general functional arrangement of the ASC apparatus 10A according to the second embodiment. The ASC apparatus 10A is of basically the same arrangement as the ASC apparatus 10 according to the first embodiment, but differs therefrom in that a delay circuit 50 (50*b*) is connected between the engine rotation frequency detecting circuit 12 and the engine rotation frequency change calculating circuit 16, rather than between the engine rotation frequency detecting circuit 12 and the reference signal generating circuit 14.

(3) Sound Effect Output from the ASC Apparatus 10A According to the Second Embodiment According to the second embodiment, since the delay circuit 50*b* is connected between the detecting circuit 12 and the calculating circuit 16, the delay circuit 50b adds a delay Zb to the sound pressure level (the output of the amplitude component) of the sound effect SE produced by the ASC apparatus 10A, rather than the output of the frequency component of the sound effect SE produced by the ASC apparatus 10A.

Figure 4A:
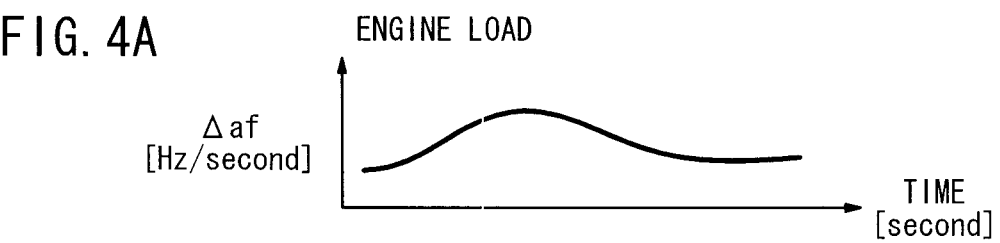
FIG. 4A is a diagram showing an example of an engine load.
Figure 4B:
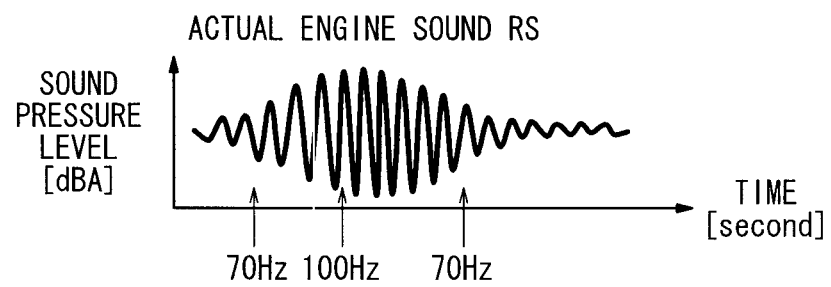
FIG. 4B is a diagram showing the waveform of an actual engine sound corresponding to the engine load shown in FIG. 4A.
Figure 4C:
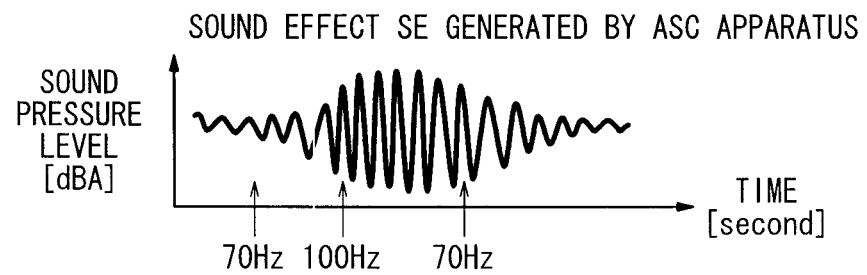
FIG. 4C is a diagram showing the waveform of a sound effect output by the active sound control apparatus shown in FIG. 3 depending on the engine load shown in FIG. 4A.

Therefore, if the engine 80 is under a load as shown in FIG. 4A and the actual engine sound RS is produced by the engine 80 as shown in FIG. 4B, then the sound effect SE is output from the ASC apparatus 10A according to the second embodiment as shown in FIG. 4C.

As can be seen from FIGS. 4B and 4C, the output of the frequency component of the actual engine sound RS and the output of the frequency component of the sound effect SE are in agreement with each other at each point of time. However, the sound pressure level (the output of the amplitude component) of the sound effect SE is delayed from the sound pressure level of the actual engine sound RS by a delay time which is caused by the delay Zb set in the delay circuit 50.

Accordingly, if the engine rotation frequency change Δaf is increased, increasing the sound pressure level of the actual engine sound RS, then the sound pressure level of the sound effect SE increases with a predetermined delay, causing the passenger at the passenger position 30 to sense a sound reverberation due to the delay in the increase of the sound pressure level of the sound effect SE.

(4) Advantages of the Second Embodiment

As described above, the ASC apparatus 10A according to the second embodiment generates the sound effect SE based on the engine rotation frequency signal Sfe, and includes the delay circuit 50b for adding the delay Zb to the output of the amplitude component of the sound effect SE.

Since the delay Zb is added to the output of the amplitude component of the sound effect SE, the output of the sound effect SE can be controlled in a wider range for enhancing the live sound atmosphere in the passenger compartment.

The gain determining circuit 18 of the ASC apparatus 10A adjusts the amplitude component of the sound effect SE depending on the engine rotation frequency change Δaf, and the delay circuit 50b delays the engine rotation frequency change signal Saf to add the delay Zb to the output of the amplitude component of the sound effect SE.

Thus, the delay Zb can be added to the output of the amplitude component of the sound effect SE by delaying the engine rotation frequency change signal Saf. Since the output of the amplitude component of the sound effect SE is delayed with respect to the output of the amplitude component of the actual engine sound RS, the passenger at the passenger position 30, to which the sound effect SE is to be output, is able to sense the sound reverberation, thereby improving the live sound atmosphere in the passenger compartment.

The delay Zb added to the engine rotation frequency change signal Saf may be varied depending on the engine rotation frequency change Δaf. For example, the delay time may be increased as the engine rotation frequency change Δaf increases. The delay Zb may be generated only when the engine rotation frequency change Δaf exceeds a predetermined value (e.g., 5 Hz/second).

C. Third Embodiment (1) Feature of the Third Embodiment

Figure 5:
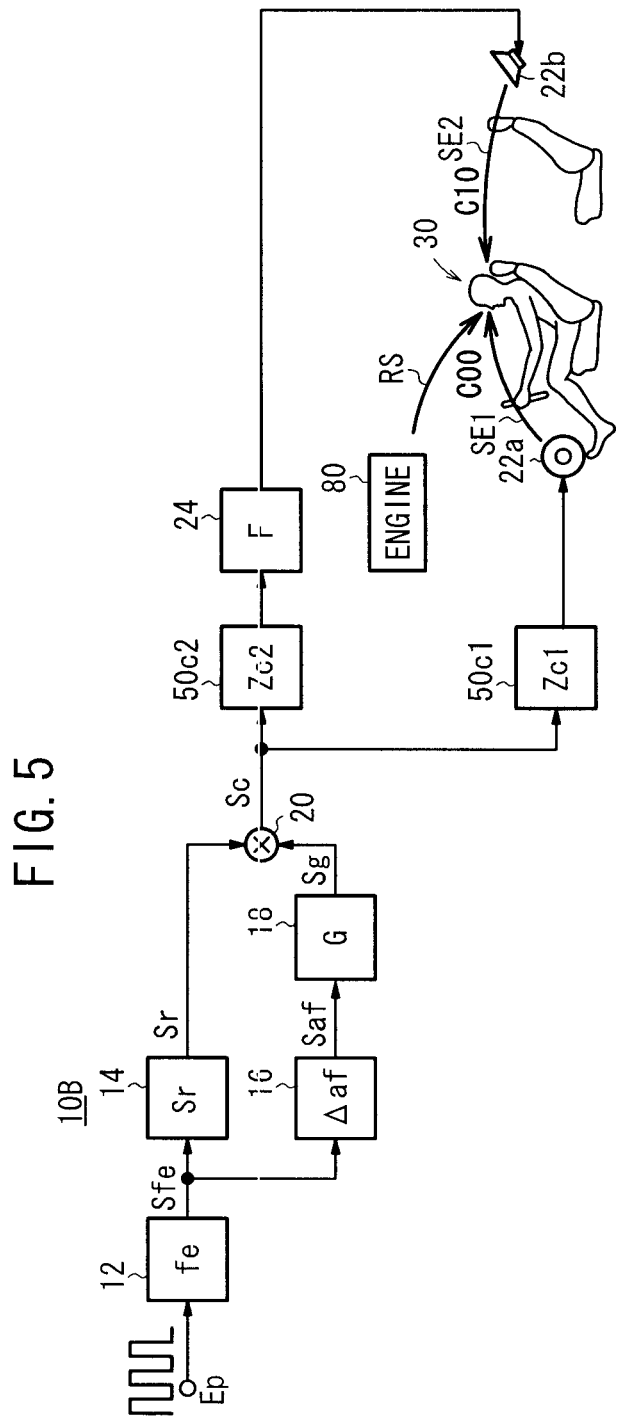
FIG. 5 is a block diagram showing a general functional arrangement of an active sound control apparatus according to the third embodiment of the present invention.

An active sound control apparatus 10B (hereafter referred to as "ASC apparatus 10B") according to the third embodiment of the present invention shown in FIG. 5 resides in that it has two speakers 22a, 22b for outputting respective sound effects SE1, SE2 to reach the passenger position 30 at different times.

(2) Mechanism for Generating the Sound Effect (Differences with the First Embodiment)

FIG. 5 is a block diagram showing a general functional arrangement of the ASC apparatus 10B according to the third embodiment. The ASC apparatus 10B is of basically the same arrangement as the ASC apparatus 10 according to the first embodiment, but differs therefrom as described below.

The ASC apparatus 10B includes the speakers 22a, 22b disposed at respective two front and rear positions, i.e., one in front of and the other behind the passenger position 30, and a compensation filter 24 for the speaker 22b in the rear position. The compensation filter 24 serves to compensate for the difference between transfer characteristics C00 from the speaker 22a to the passenger position 30 and transfer characteristics C10 from the speaker 22b to the passenger position 30. The compensation filter 24 may be the compensation filter disclosed in U.S. Patent Application Publication No. 2006/0215846 (see paragraphs [0100] through [0104] thereof).

Delay circuits 50 (50c1, 50c2) are disposed between the multiplier 20 and the front speaker 22a and also between the multiplier 20 and the compensation filter 24. No delay circuit is disposed between the engine rotation frequency detecting circuit 12 and the reference signal generating circuit 14. A delay Zc2 added by the delay circuit 50c2 disposed between the multiplier 20 and the compensation filter 24 is longer than a delay Zc1 added by the delay circuit 50c1 disposed between the multiplier 20 and the front speaker 22a.

Figure 6A:
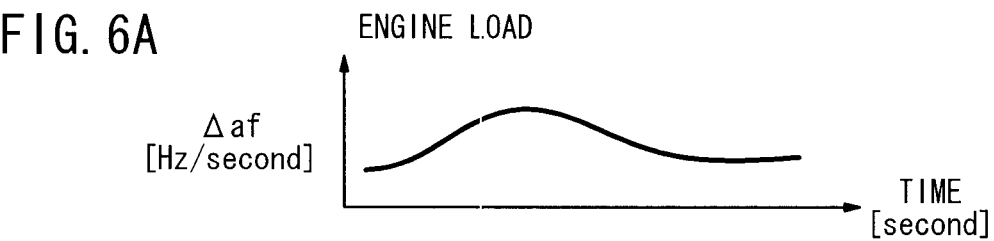
FIG. 6A is a diagram showing an example of an engine load.
Figure 6B:
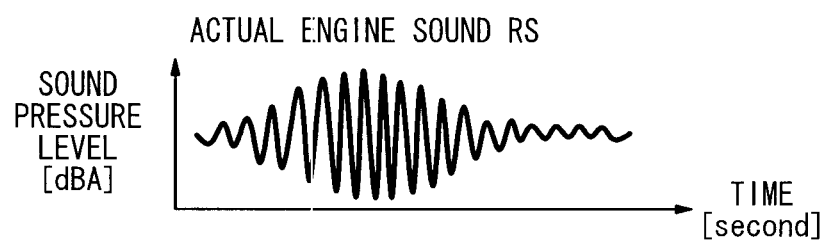
FIG. 6B is a diagram showing the waveform of an actual engine sound corresponding to the engine load shown in FIG. 6A.
Figure 6C:
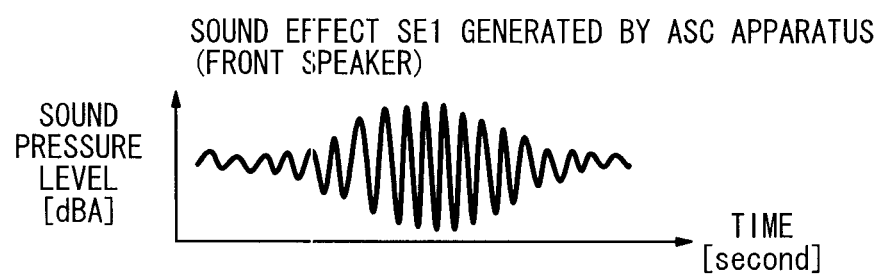
FIG. 6C is a diagram showing the waveform of a sound effect output by a front speaker of the active sound control apparatus shown in FIG. 5 depending on the engine load shown in FIG. 6A.
Figure 6D:
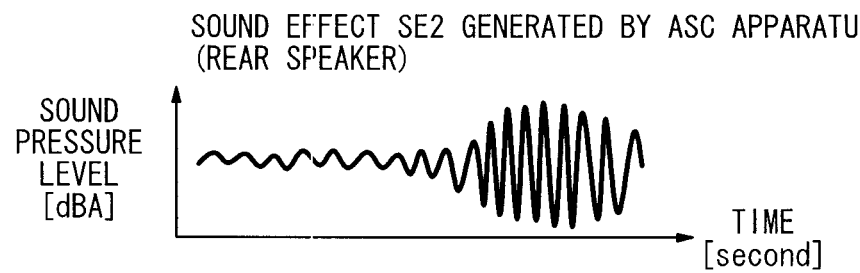
FIG. 6D is a diagram showing the waveform of a sound effect output by a rear speaker of the active sound control apparatus shown in FIG. 5 depending on the engine load shown in FIG. 6A.

(3) Sound Effect Output from the ASC Apparatus 10B According to the Third Embodiment In the ASC apparatus 10B, the delay circuit 50c1 is disposed between the multiplier 20 and the front speaker 22a, and the delay circuit 50c2 is disposed between the multiplier 20 and the compensation filter 24, and the delay Zc2 added by the delay circuit 50c2 is longer than the delay Zc1 added by the delay circuit 50c1. Therefore, if the engine 80 is under a load as shown in FIG. 6A and the actual engine sound RS is produced by the engine 80 as shown in FIG. 6B, then the front speaker 22a outputs a sound effect SE1 with a predetermined delay time (e.g., 0.05 second) from the actual engine sound RS, as shown in FIG. 6C, and the rear speaker 22b outputs a sound effect SE2 with a longer delay time (e.g., 0.15 second), as shown in FIG. 6D.

Consequently, the actual engine sound RS, then the sound effect SE1 from the front speaker 22a, and thereafter the sound effect SE2 from the rear speaker 22b reach the passenger position 30 in that order. The passenger at the passenger position 30 senses as if the engine 80 is moving from the front to rear of the passenger position 30.

Depending on the difference between the frequencies of the sound effects SE1, SE2 output from the speakers 22a, 22b, the passenger at the passenger position 30 senses a beat resulting from the frequency difference, as with the first embodiment.

Furthermore, the passenger at the passenger position 30 also senses a sound reverberation depending on the delay time of the output of the amplitude component between the actual engine sound RS and the sound effect SE1 output from the front speaker 22a, the delay time of the output of the amplitude component between the actual engine sound RS and the sound effect SE2 output from the rear speaker 22b, and the delay time of the output of the amplitude component between the sound effect SE1 output from the front speaker 22a and the sound effect SE2 output from the rear speaker 22b, as with the second embodiment.

(4) Advantages of the Third Embodiment

As described above, the ASC apparatus 10B according to the third embodiment generates the sound effects SE1, SE2 based on the engine rotation frequency signal Sfe, and includes the delay circuits 50c1, 50c2 for adding the delays to the outputs of all the components of the sound effects SE1, SE2.

Since the delays are added to the outputs of all the components of the sound effects SE1, SE2, the outputs of the sound effects SE1, SE2 can be controlled in a wider range for increasing the live sound atmosphere in the passenger compartment.

The sound effects SE1, SE2 reach the passenger position 30, to which the sound effects SE1, SE2 are to be output, with delays from the actual engine sound RS. The passenger at the passenger position 30, therefore, senses as if the engine 80, as a vibratory noise source, is moving, thereby increasing the live sound atmosphere in the passenger compartment.

The ASC apparatus 10B includes the plural speakers 22a, 22b, and the delay circuits 50c1, 50c2 set delays for the outputs of all the components of the sound effects SE1, SE2 for the respective speakers 22a, 22b.

Accordingly, the passenger at the passenger position 30 can sense easily as if the engine 80 is moving, so that the live sound atmosphere in the passenger compartment can be increased.

If the frequency difference between the sound effects SE1, SE2 output from the speakers 22a, 22b is small, then the ASC apparatus 10B offers the same advantages as the ASC apparatus 10 according to the first embodiment. The ASC apparatus 10B also offers the same advantages as the ASC apparatus 10A according to the second embodiment, depending on the delay time of the output of the amplitude component between the actual engine sound RS and the sound effect SE1 output from the front speaker 22a, the delay time of the output of the amplitude component between the actual engine sound RS and the sound effect SE2 output from the rear speaker 22b, and the delay time of the output of the amplitude component between the sound effect SE1 output from the front speaker 22a and the sound effect SE2 output from the rear speaker 22b.

D. Fourth Embodiment (1) Feature of the Fourth Embodiment

Figure 7:
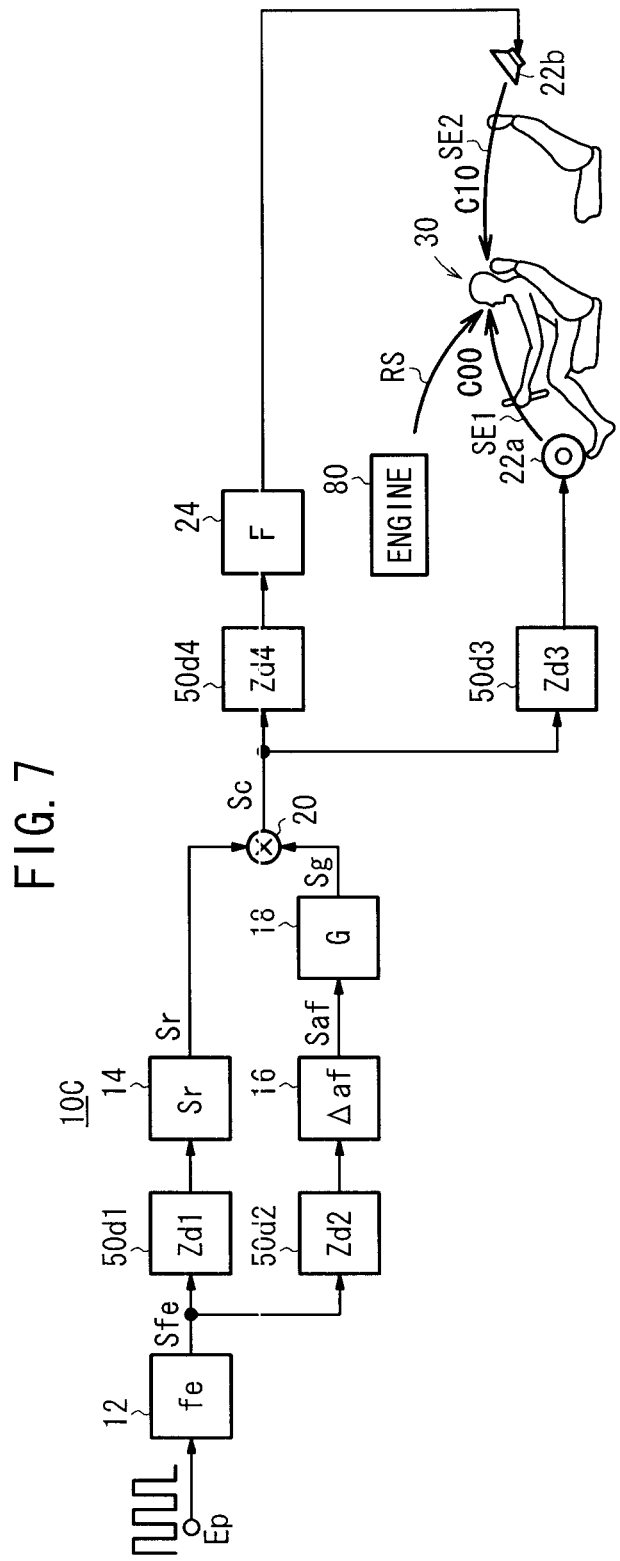
FIG. 7 is a block diagram showing a general functional arrangement of an active sound control apparatus according to the fourth embodiment of the present invention.

An active sound control apparatus 10C (hereafter referred to as "ASC apparatus 10C") according to the fourth embodiment of the present invention shown in FIG. 7 incorporates all the features of the ASC apparatus 10, 10A, 10B according to the first through third embodiments described above. Specifically, the ASC apparatus 10C includes a delay circuit 50d1 disposed between the engine rotation frequency detecting circuit 12 and the reference signal generating circuit 14, a delay circuit 50d2 disposed between the engine rotation frequency detecting circuit 12 and the engine rotation frequency change calculating circuit 16, a delay circuit 50d3 disposed between the multiplier 20 and the front speaker 22a, and a delay circuit 50d4 disposed between the multiplier 20 and the compensation filter 24.

Figure 8A:
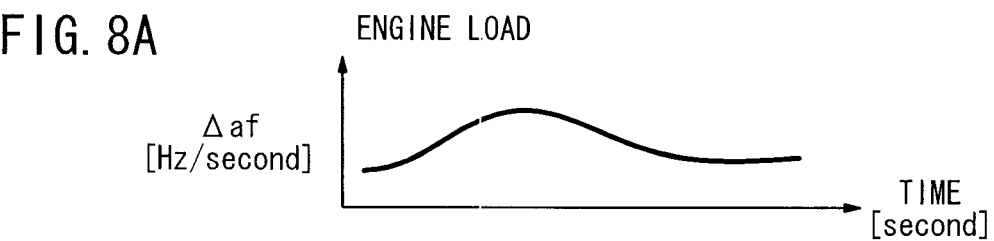
FIG. 8A is a diagram showing an example of an engine load.
Figure 8B:
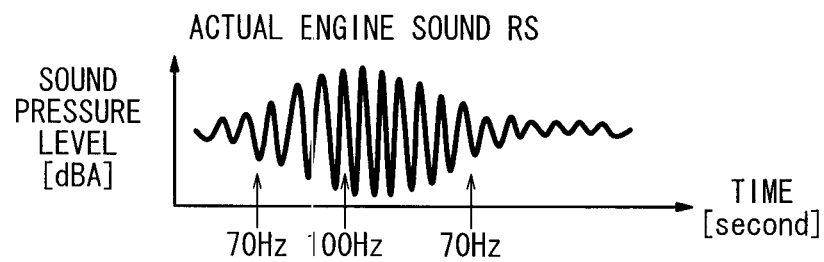
FIG. 8B is a diagram showing the waveform of an actual engine sound corresponding to the engine load shown in FIG. 8A.
Figure 8C:
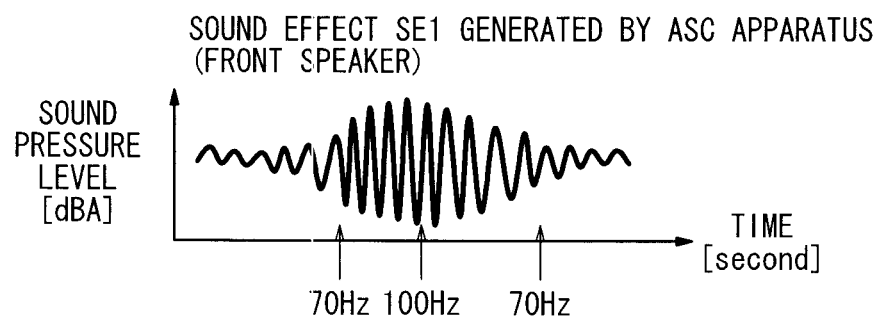
FIG. 8C is a diagram showing the waveform of a sound effect output by a front speaker of the active sound control apparatus shown in FIG. 7 depending on the engine load shown in FIG. 8A.
Figure 8D:
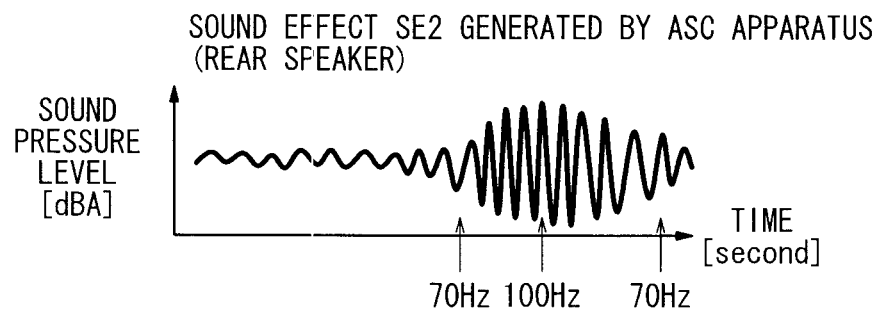
FIG. 8D is a diagram showing the waveform of a sound effect output by a rear speaker of the active sound control apparatus shown in FIG. 7 depending on the engine load shown in FIG. 8A.

(2) Sound Effect Output from the ASC Apparatus 10C According to the Fourth Embodiment According to the fourth embodiment, the four delay circuits 50 (50d1 through 50c4) perform respective delaying processes. Therefore, if the engine 80 is under a load as shown in FIG. 8A and the actual engine sound RS is produced by the engine 80 as shown in FIG. 8B, then the front speaker 22a outputs a sound effect SE1 as shown in FIG. 8C and the rear speaker 22b outputs a sound effect SE2 as shown in FIG. 8D.

As can be seen from FIGS. 8A through 8D, the ASC apparatus 10C allows the passenger at the passenger position 30 to sense a beat resulting from the frequency difference between the sound effects SE1, SE2 and the actual engine sound RS, to sense a sound reverberation due to the delay of the outputs of the amplitude components of the sound effects SE1, SE2 from the output of the amplitude component of the actual engine sound RS, and also to sense as if the engine 80, i.e., the vibratory noise source, is moving due to the delay of the sound effect SE1 output from the speaker 22a from the actual engine sound RS and also the delays of the sound effect SE2 output from the speaker 22b from the actual engine sound RS and the sound effect SE1 output from the speaker 22a.

(3) Advantages of the Fourth Embodiment

As described above, the ASC apparatus 10C offers all the advantages of the ASC apparatus 10, 10A, 10B according to the first through third embodiments.

E. Fifth Embodiment (1) Feature of the Fifth Embodiment

Figure 9:
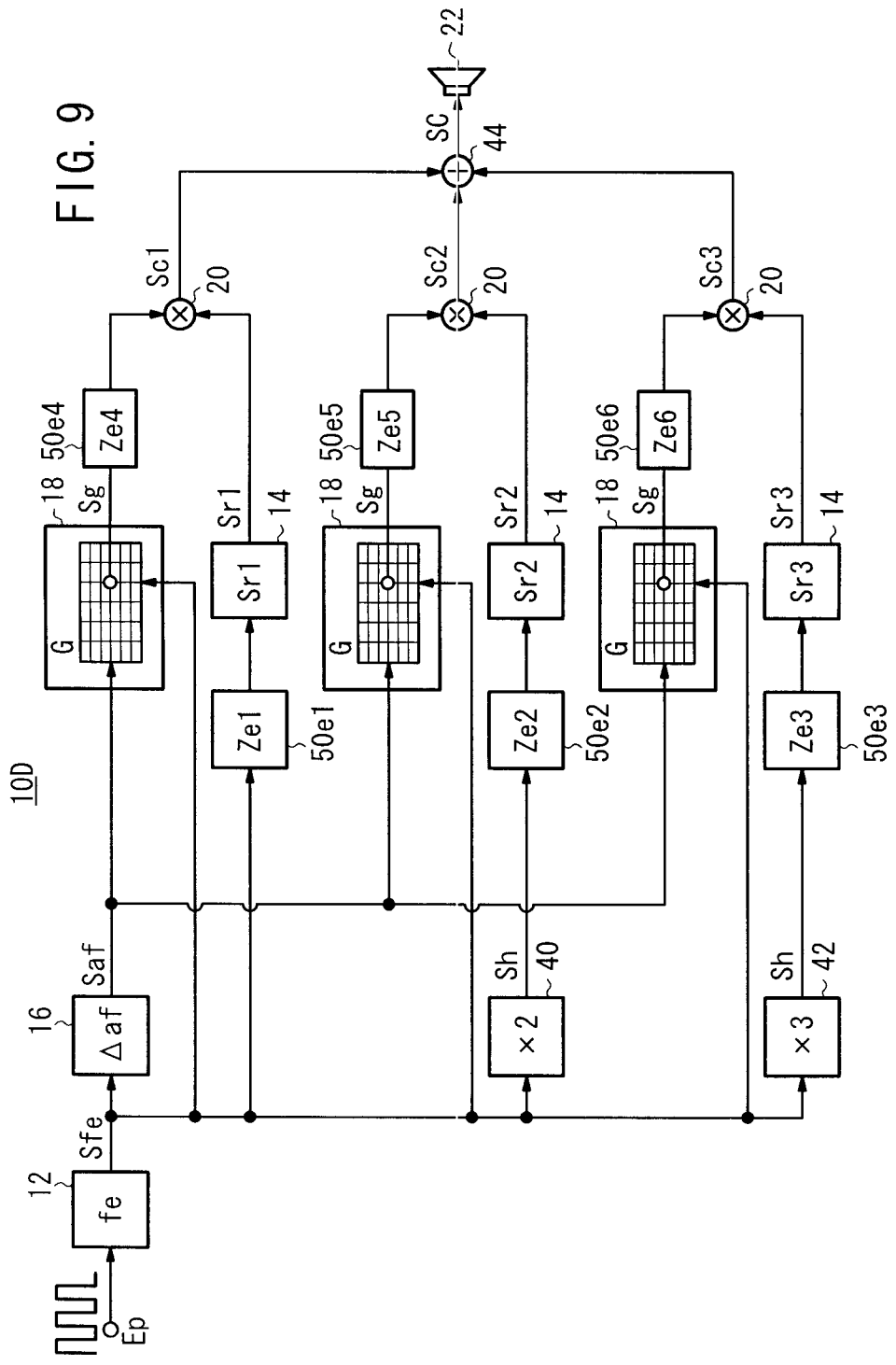
FIG. 9 is a block diagram showing a general functional arrangement of an active sound control apparatus according to the fifth embodiment of the present invention.

An active sound control apparatus 10D (hereafter referred to as "ASC apparatus 10D") according to the fifth embodiment of the present invention shown in FIG. 9 resides in that it produces delays Ze1 through Ze6 depending on a plurality of reference signals Sr1, Sr2, Sr3 having different degrees.

(2) Mechanism for Generating the Sound Effect (Differences with the First Embodiment)

FIG. 9 is a block diagram showing a general functional arrangement of the ASC apparatus 10D according to the fifth embodiment. The ASC apparatus 10D generates control signals Sc1, Sc2, Sc3 based on the reference signals Sr1, Sr2, Sr3 of harmonics having different degrees. The control signals Sc1, Sc2, Sc3 are combined into a control signal SC by an adder 44.

The control signals Sc1, Sc2, Sc3 are generated basically in the same manner as the control signal Sc in the ASD apparatus 10 according to the first embodiment.

Specifically, the generation of the control signal Sc1 will be described below. The reference signal generating circuit 14 generates a reference signal Sr1 based on the engine rotation frequency signal Sfe from the engine rotation frequency detecting circuit 12. At the same time, the gain determining circuit 18 generates a gain signal Sg based on an engine rotation frequency change signal Saf from the engine rotation frequency change calculating circuit 16. The multiplier 20 multiplies the reference signal Sr1 by the gain G represented by the gain signal Sg, producing a control signal Sc1. A delay circuit 50e1 is disposed between the detecting circuit 12 and the reference signal generating circuit 14 and adds a delay Ze1 to the signal Sfe. A delay circuit 50e4 is disposed between the gain determining circuit 18 and the multiplier 20 and adds a delay Ze4 to the gain signal Sg.

The control signals Sc2, Sc3 are generated basically in the same manner as the control signal Sc1. However, a multiplier 40 is used in the generation of the control signal Sc2, and a multiplier 42 is used in the generation of the control signal Sc3. The multipliers 40, 42 function as frequency converters. Specifically, the multiplier 40 converts the frequency of the engine rotation frequency signal Sfe into a twofold frequency, i.e., generates a second harmonic signal Sh of the engine rotation frequency fe. The multiplier 42 converts the frequency of the engine rotation frequency signal Sfe into a threefold frequency, i.e., generates a third harmonic signal Sh of the engine rotation frequency fe.

Unlike the first through fourth embodiments, the gain determining circuits 18 according to the fifth embodiment determine gains G by which to multiply the reference signals Sr1, Sr2, Sr3 depending on the engine rotation frequency signal Sfe, the engine rotation frequency change signal Saf, and the degrees of the reference signals Sr1, Sr2, Sr3.

For example, a gain characteristic map is provided which stores gains for use in the "acceleration adjusting process" described in U.S. Patent Application Publication No. 2006/0215846 (see paragraphs [0105] through [0115], [0124] thereof) and the "degree-specific correcting process" described in U.S. Patent Application Publication No. 2006/0215846 (see paragraphs [0083] through [0088], [0122] thereof) and gains depending on the engine rotation frequency fe, in association with parameters representing the engine rotation frequency fe, the engine rotation frequency change $\Delta$af, and the degrees of the reference signals Sr1, Sr2, Sr3, and the gain G is determined from the gain characteristic map based on the above three parameters. The gain corresponding to the engine rotation frequency change $\Delta$af may not necessarily be of the gain characteristics disclosed in U.S. Patent Application Publication No. 2006/0215846, but may be of other gain characteristics.

The gains depending on the engine rotation frequency fe may include a gain which is not increased in a low engine rotation frequency range (e.g., from 0 to 3000 rpm), a gain which is increased as the engine rotation frequency fe increases in a medium engine rotation frequency range (e.g., from 3001 to 4500 rpm), and a gain which is maximum and constant in a high engine rotation frequency range (e.g., from 4501 rpm).

For an easier understanding of the fifth embodiment, the passenger position, the engine, etc. are omitted from illustration in FIG. 9.

(3) Advantages of the Fifth Embodiment

As described above, the ASC apparatus 10D according to the fifth embodiment generates the sound effect based on the engine rotation frequency signal Sfe, and includes the delay circuits 50e1 through 50e6 for adding the delays Ze1 through Ze6 to the outputs of the frequency and amplitude components of the sound effect.

Since the delays are added to the outputs of the frequency and amplitude components of the sound effect, the output of the sound effect can be controlled in a wider range for increasing the live sound atmosphere in the passenger compartment.

The delay added to the engine rotation frequency signal Sfe causes the frequency of the actual engine sound and the frequency of the sound effect to differ from each other. The frequency difference causes the passenger at the passenger position, to which the sound effect is to be output, to sense a beat resulting from the actual engine sound and the sound effect, increasing the live sound atmosphere in the passenger compartment.

The gain determining circuit 18 of the ASC apparatus 10D adjusts the amplitude component of the sound effect depending on the engine rotation frequency change $\Delta$af, and the delay circuits 50e4 through 50e6 add the delays Ze4 through Ze6 to the gain signal Sg to delay the output of the amplitude component of the sound effect.

When the delays Ze4 through Ze6 are added to the gain signal Sg, the output of the amplitude component of the sound effect is delayed. Therefore, since the output of the amplitude component of the sound effect is delayed with respect to the output of the amplitude component of the actual engine sound, the passenger at the passenger position, to which the sound effect is to be output, is able to sense a sound reverberation, thereby increasing the live sound atmosphere in the passenger compartment.

The ASD apparatus 10D includes the reference signal generating circuit 14 for generating a plurality of reference signals Sr1, Sr2, Sr3 of harmonics having different degrees based on the engine rotation frequency signal Sfe. The delay circuits 50e1 through 50e6 delay the engine rotation frequency signal Sfe and the gain signal Sg per reference signal Sr1, Sr2, Sr3.

The delays Ze1 through Ze6 to be added to the engine rotation frequency signal Sfe and the gain signal Sg can be set for each of the reference signals Sr1, Sr2, Sr3 for controlling the output of the sound effect in greater detail.

The delays Ze1 through Ze6 to be added to the engine rotation frequency signal Sfe and the gain signal Sg may be varied depending on the engine rotation frequency change $\Delta$af. For example, the delay times may be increased as the engine rotation frequency change $\Delta$af increases. The delays may be added only when the engine rotation frequency change $\Delta$af exceeds a predetermined value (e.g., 5 Hz/second).

F. Applications of the Invention

The present invention is not limited to the above embodiments, but may be altered in various ways based on the description of invention. For example, the present invention may incorporate the following alterations (1) through (6):

(1) Vibratory Noise Source Signal:

In each of the above embodiments, the engine rotation frequency signal Sfe is used as a vibratory noise source signal for generating a sound effect. However, the vibratory noise source signal is not limited to the engine rotation frequency signal Sfe, but may be any of various signals insofar as they represent a running state of the vehicle or an operating state of the engine. For example, the vibratory noise source signal may be a signal representative of a vehicle speed, a tire rotation frequency, a wheel rotation frequency, a propeller shaft rotation frequency, a transmission shaft rotation frequency, an engine throttle valve opening, an engine intake manifold internal pressure, an engine ignition angle, a vehicle speed change, or an engine mount displacement. If the vehicle is a hybrid vehicle or an electric vehicle, then the vibratory noise source signal may be a signal representative of a motor rotation frequency.

(2) Signal to be Delayed and the Position of the Delay Circuit:

In each of the above embodiments, the signal to be delayed by the delay circuit 50 is the engine rotation frequency signal Sfe input to the reference signal generating circuit 14 (the first embodiment shown in FIG. 1, the fourth embodiment shown in FIG. 7, and the fifth embodiment shown in FIG. 9), the engine rotation frequency signal Sfe input to the engine rotation frequency change calculating circuit 16 (the second embodiment shown in FIG. 3 and the fourth embodiment shown in FIG. 7), or the control signal Sc input to the speakers 22a, 22b (the third embodiment shown in FIG. 5 and the fourth embodiment shown in FIG. 7). However, the signal to be delayed may be changed, or in other words, the position of the delay circuit 50 may be changed.

Figure 10:
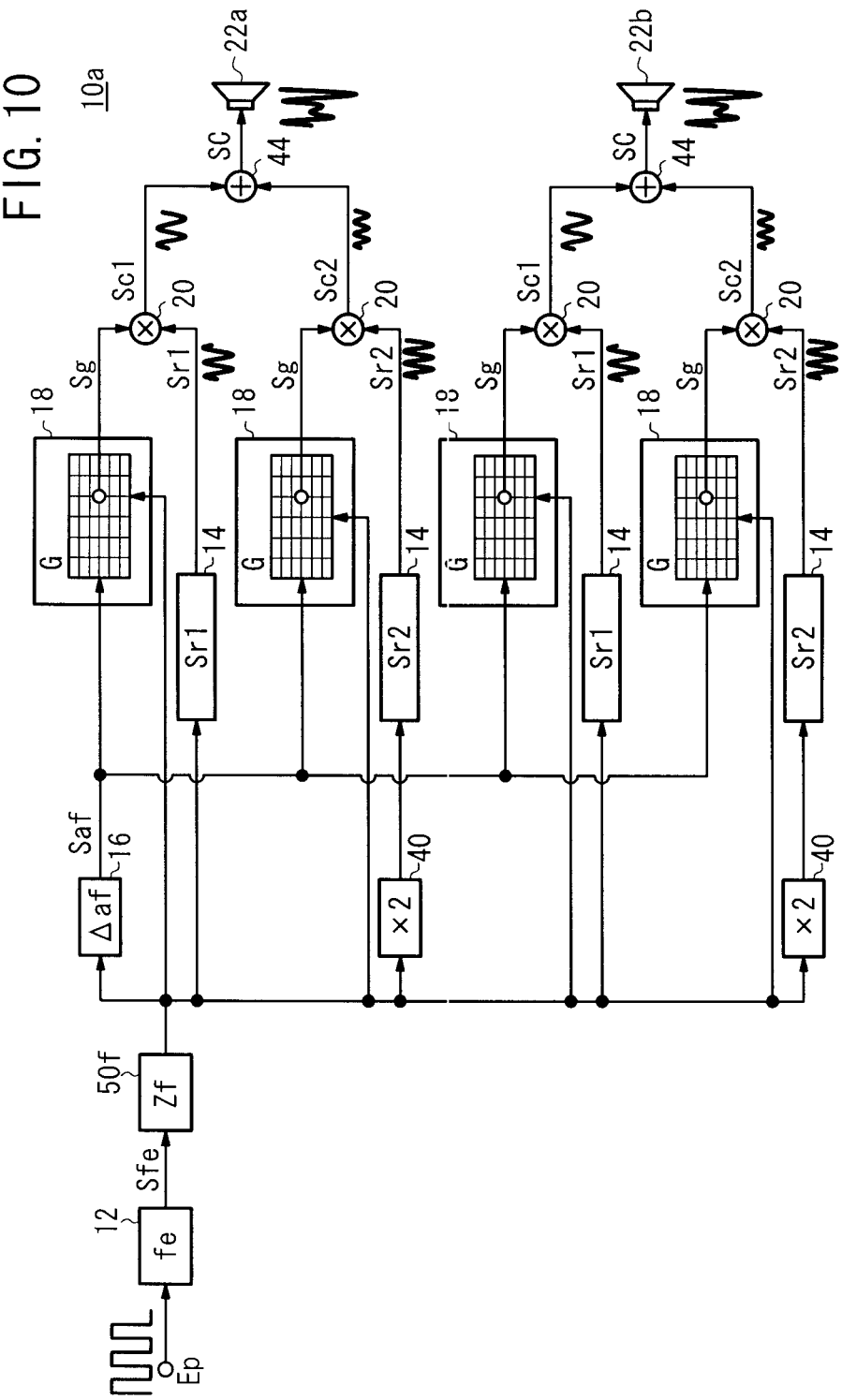
FIG. 10 is a block diagram showing a general functional arrangement of an active sound control apparatus according to the first modification of the present invention.

For example, FIG. 10 shows an active sound control apparatus 10a (hereinafter referred to as "ASC apparatus 10a") according to a first modification of the present invention. The active sound control apparatus 10a includes a delay circuit 50 (50f) positioned immediately after the engine rotation frequency detecting circuit 12 for delaying altogether the engine rotation frequency signal Sfe for generating the reference signal Sr and determining the gain G by which the reference signal Sr is multiplied, and the engine rotation frequency change signal Saf for determining the gain G by which the reference signal Sr is multiplied.

Figure 11:
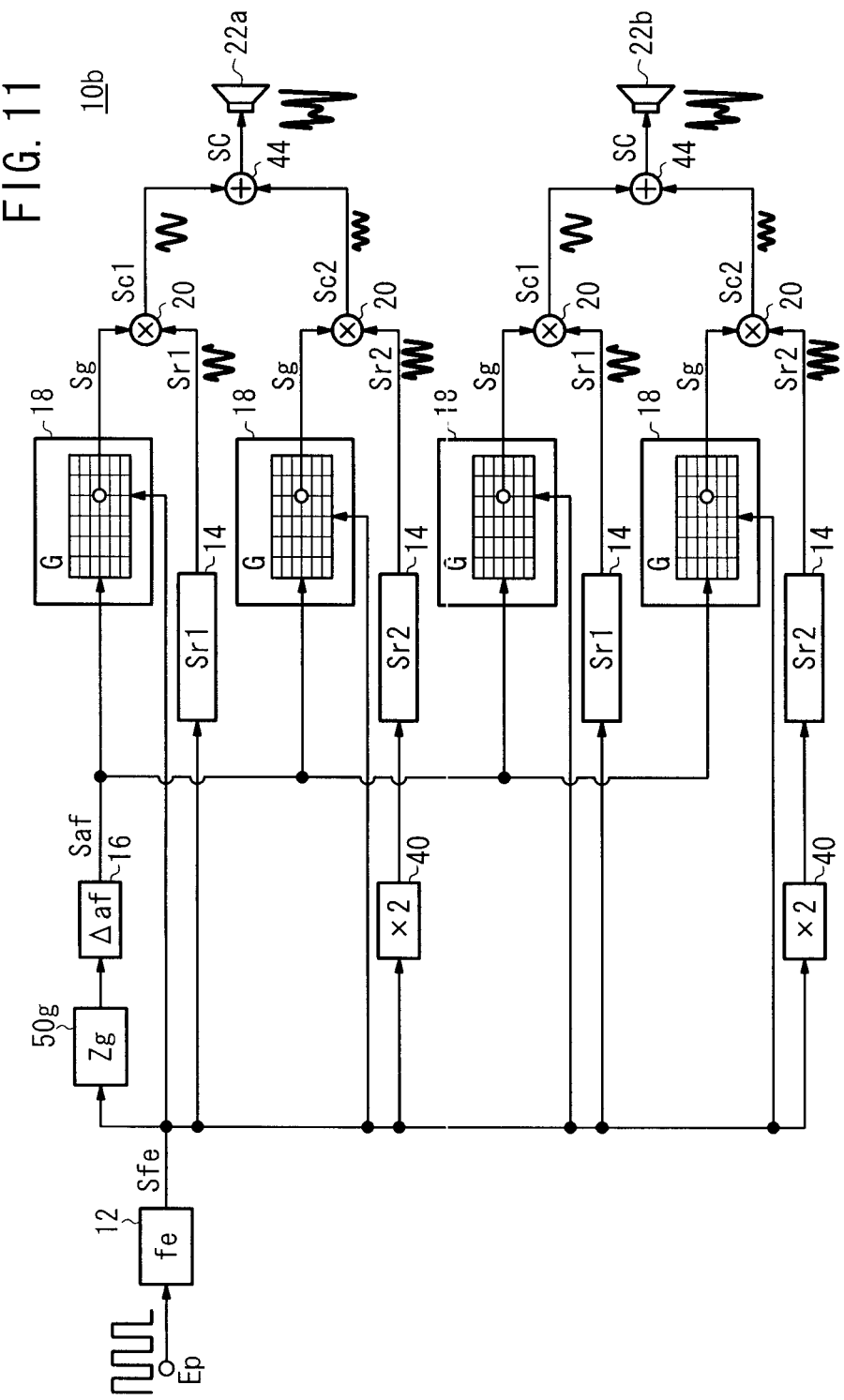
FIG. 11 is a block diagram showing a general functional arrangement of an active sound control apparatus according to the second modification of the present invention.
Figure 12:
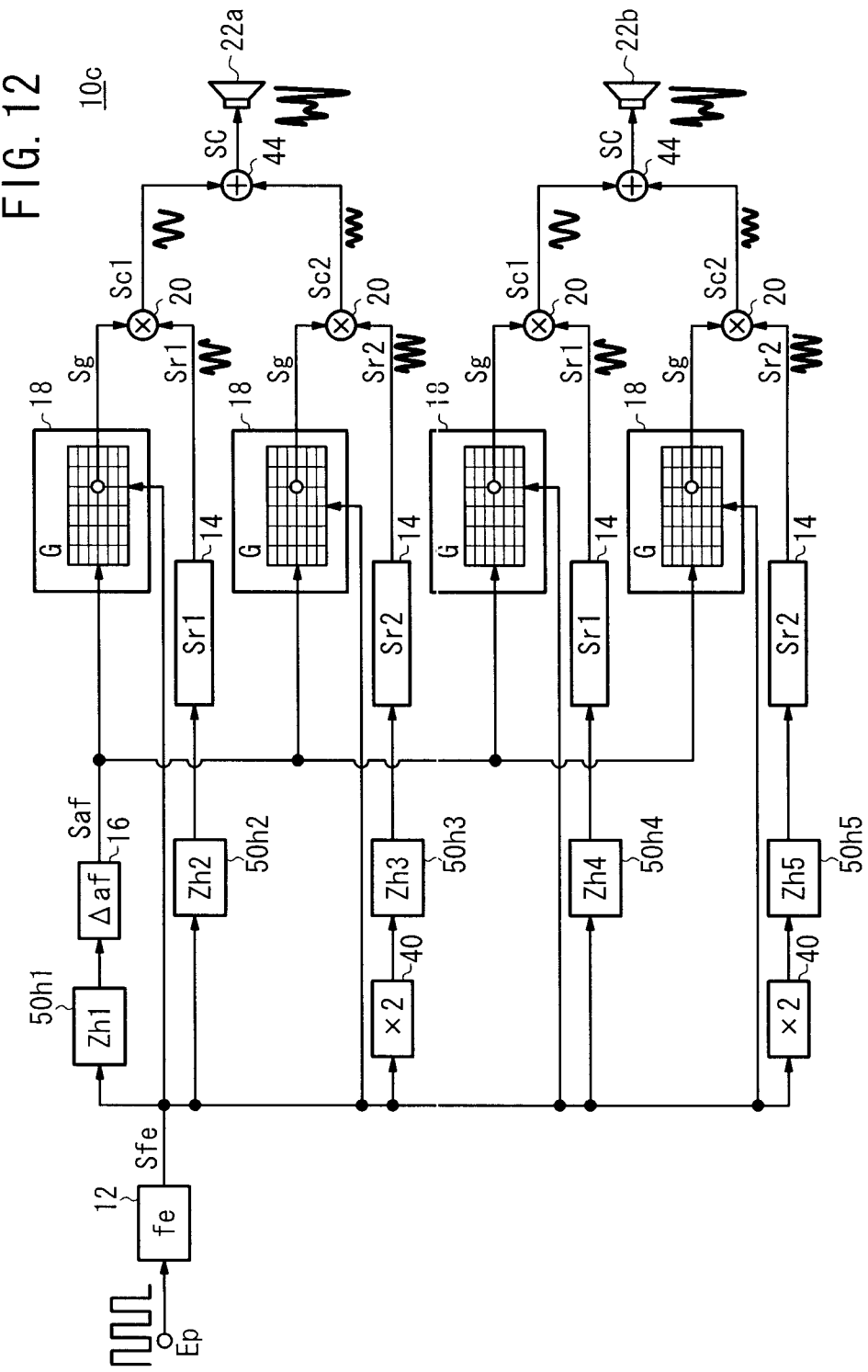
FIG. 12 is a block diagram showing a general functional arrangement of an active sound control apparatus according to the third modification of the present invention.
Figure 13:
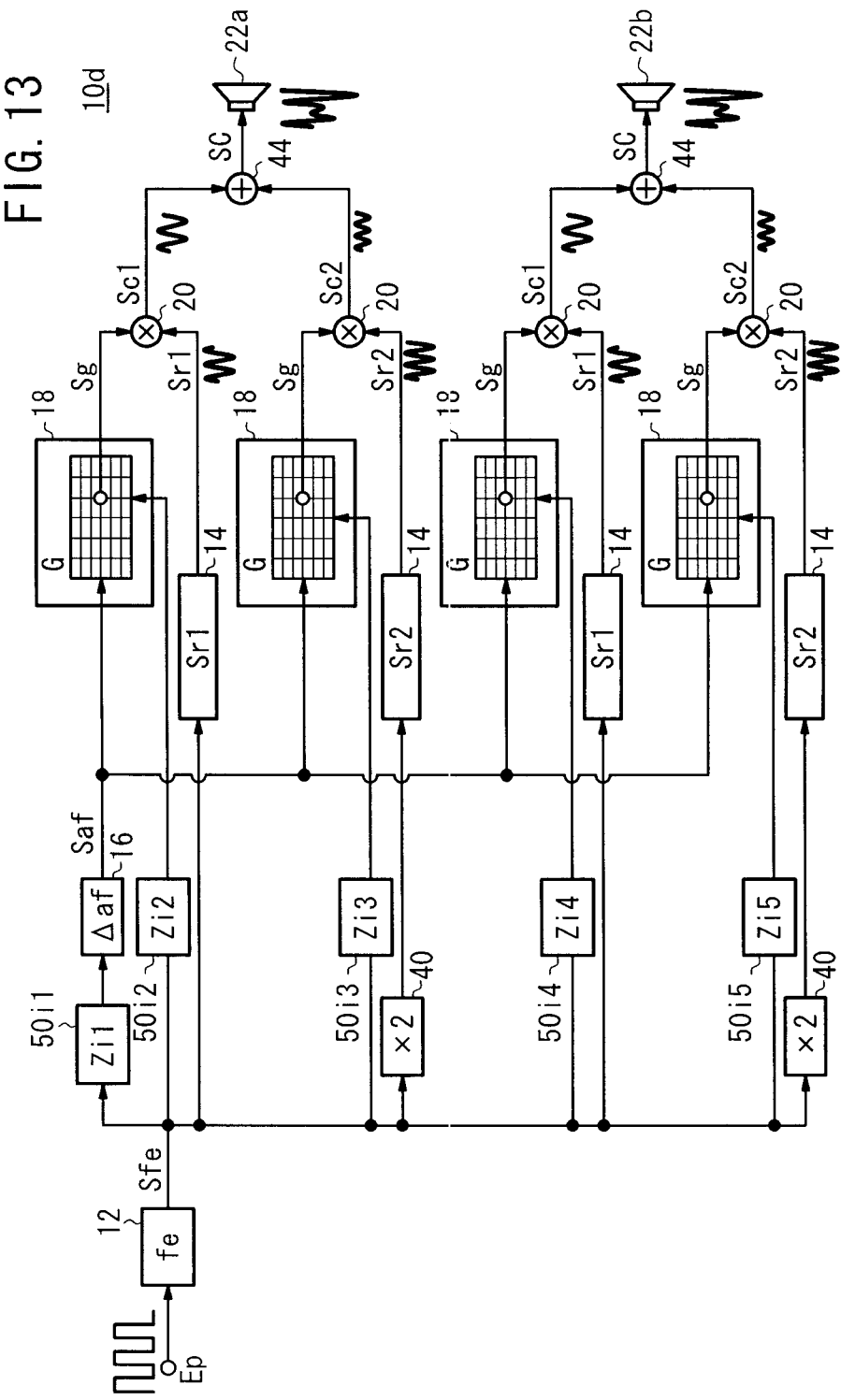
FIG. 13 is a block diagram showing a general functional arrangement of an active sound control apparatus according to the fourth modification of the present invention.
Figure 14:
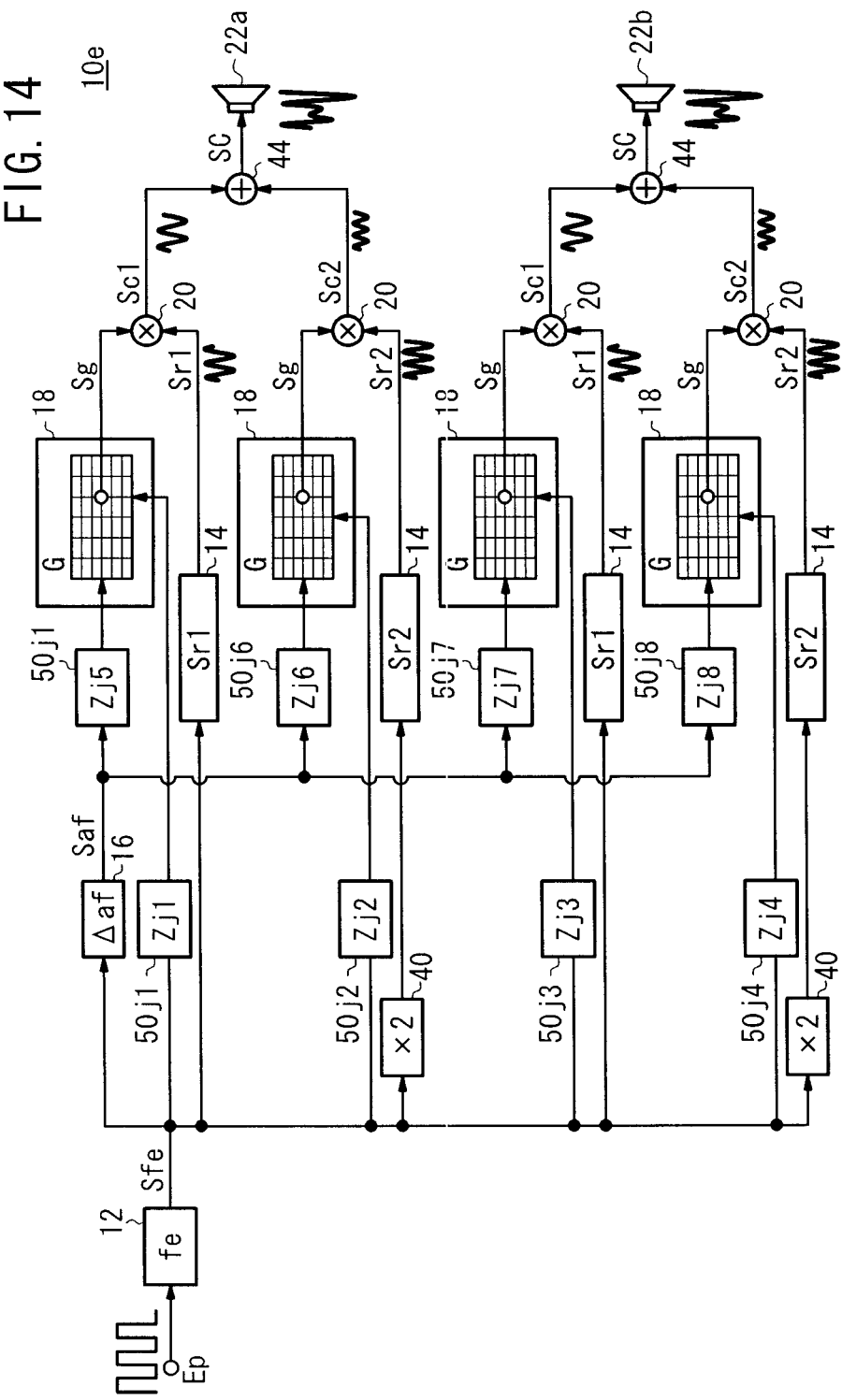
FIG. 14 is a block diagram showing a general functional arrangement of an active sound control apparatus according to the fifth modification of the present invention.

FIG. 11 shows an active sound control apparatus 10b (hereinafter referred to as "ASC apparatus 10b") according to a second modification of the present invention. FIG. 12 shows an active sound control apparatus 10c (hereinafter referred to as "ASC apparatus 10c") according to a third modification of the present invention. FIG. 13 shows an active sound control apparatus 10d (hereinafter referred to as "ASC apparatus 10d") according to a fourth modification of the present invention. Each of the ASC apparatus 10b, 10c, 10d includes a delay circuit 50 (50g, 50h1, 50i1) positioned immediately before the engine rotation frequency change calculating circuit 16 for delaying the engine rotation frequency change signal Saf that is input to the gain determining circuits 18. FIG. 14 shows an active sound control apparatus 10e (hereinafter referred to as "ASC apparatus 10e") according to a fifth modification of the present invention. The ASC apparatus 10e includes delay circuits 50 (50j5 through 50j8) disposed immediately before the respective input terminals of the gain determining circuits 18 which are supplied with the engine rotation frequency change signal Saf, for delaying the output of the amplitude component of the sound effect in smaller intervals.

Figure 15:
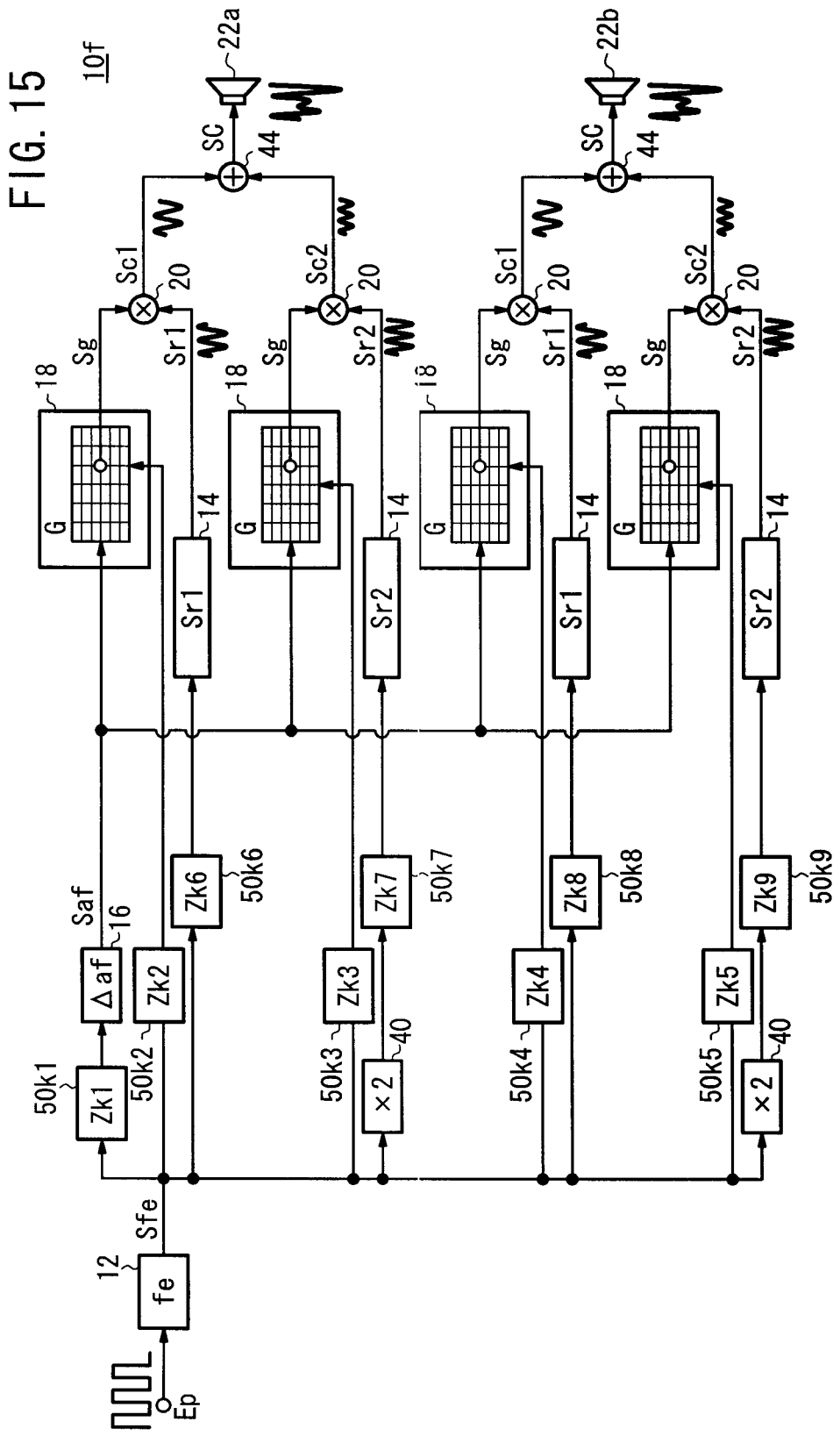
FIG. 15 is a block diagram showing a general functional arrangement of an active sound control apparatus according to the sixth modification of the present invention.

FIG. 15 shows an active sound control apparatus 10f (hereinafter referred to as "ASC apparatus 10f") according to a sixth modification of the present invention. Each of the ASC apparatus 10c shown in FIG. 12 and the "ASC apparatus 10f" shown in FIG. 15 includes delay circuits 50 (50h2 through 50h5, 50k6 through 50k9) connected immediately before the respective reference signal generating circuits 14 for delaying respective reference signals Sr.

Each of the ASC apparatus 10d, 10e, 10f shown in FIGS. 13, 14, and 15 includes delay circuits 50 (50i2 through 50i5, 50j1 through 50j4, 50k2 through 50k5) each disposed on the side of the input terminal of the gain determining circuit 18 which is supplied with the engine rotation frequency signal Sfe.

Figure 16:
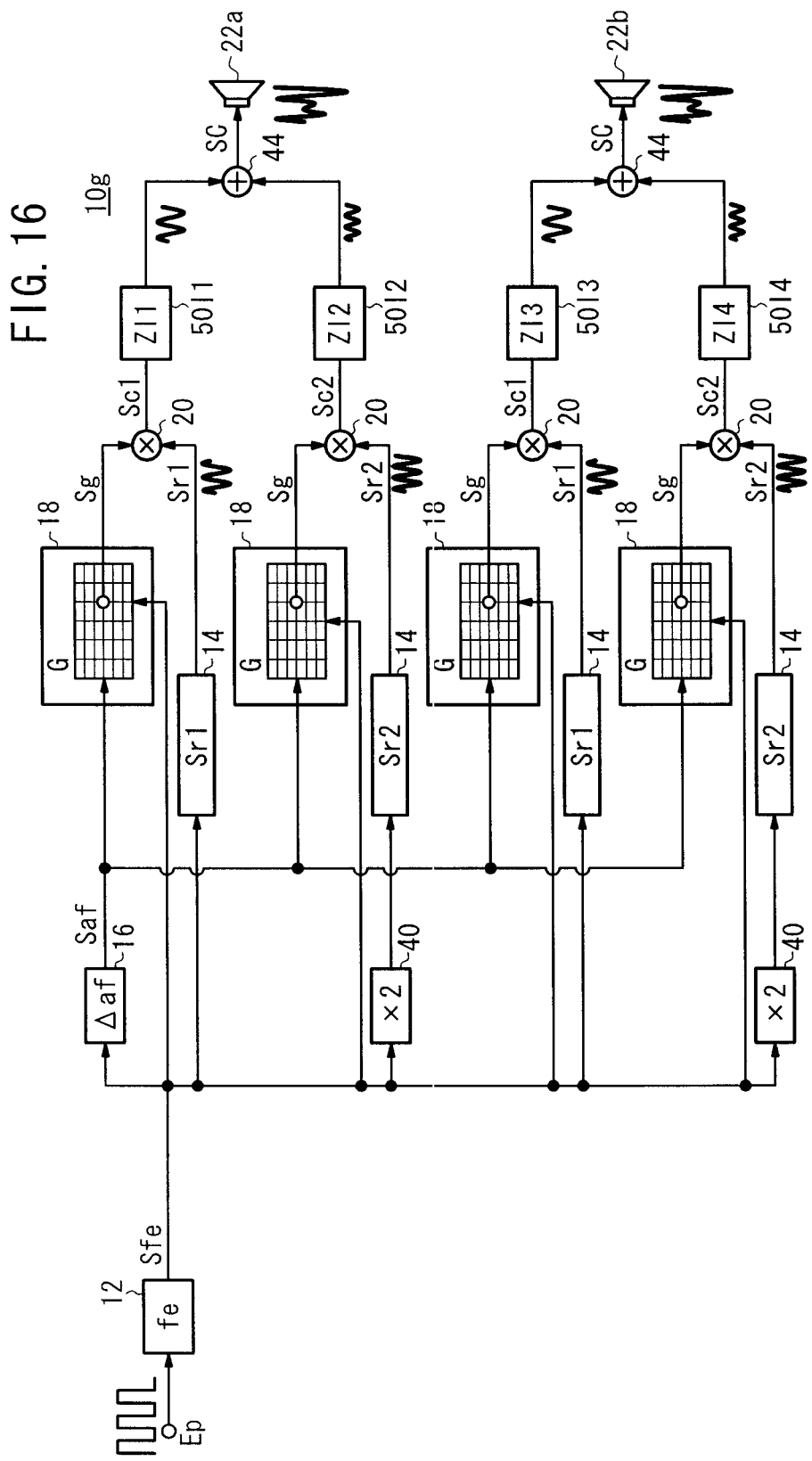
FIG. 16 is a block diagram showing a general functional arrangement of an active sound control apparatus according to the seventh modification of the present invention.

FIG. 16 shows an active sound control apparatus 10g (hereinafter referred to as "ASC apparatus 10g") according to a seventh modification of the present invention. The ASC apparatus 10g includes delay circuits 50 (50l1 through 50l4) disposed on the side of the input terminals of the adders 44.

The signal to be delayed and the position of the delay circuit may be changed depending on the vibratory noise source signal for generating the sound effect as described above under [F. Applications of the invention], (1) Vibratory noise source signal.

(3) Delay Time:

The delay time set in each of the delay circuits 50 may be set to any of desired times and is not limited to the delay times in the above embodiments.

The delay time set in each of the delay circuits 50 is not limited to a fixed time, but may be variable depending on the engine rotation frequency change Δaf. For example, the delay time may be increased or reduced depending on an increase or a reduction in the engine rotation frequency change Δaf or a vehicle speed change [km/hour/second]. For generating a delay only when the vehicle is accelerated, it is possible to produce a delay only when the engine rotation frequency change Δaf exceeds a predetermined value (e.g., 5 Hz/second).

If a plurality of reference signals Sr are generated, then it is possible to set different delay times for the respective reference signals Sr.

(4) Beat:

According to the first, fourth, and fifth embodiments, the ASC apparatus 10, 10C, 10D (FIGS. 1, 7, and 9) generates a beat from the actual engine sound. However, a beat may be generated by generating a plurality of reference signals having the same degree and delaying one of the reference signals with respect to another one of the reference signals. The generation of such a beat can be accomplished by using the arrangements (FIGS. 5, 7, etc.) wherein the control signals Sc (the reference signals Sr) output to the respective two speakers 22a, 22b are delayed. The two speakers 22a, 22b are not positionally limited to the different positions in front of and behind the passenger position 30, but both may be positioned in front of the passenger position 30.

(5) Sound Reverberation:

According to the second, fourth, and fifth embodiments, the ASC apparatus 10A, 10C, 10D (FIGS. 3, 7, and 9) generates a sound reverberation from the actual engine sound. However, a sound reverberation may be generated by generating a plurality of reference signals having the same degree and delaying the output of the amplitude component of one of the reference signals with respect to the output of the amplitude component of another one of the reference signals. As described with respect to the third embodiment (FIG. 5), the generation of such a sound reverberation can be accomplished by using the arrangements (FIGS. 5, 7, etc.) wherein the amplitude component of the control signals Sc (the reference signals Sr) output to the respective two speakers 22a, 22b are delayed. The two speakers 22a, 22b are not positionally limited to the different positions in front of and behind the passenger position 30, but both may be positioned in front of the passenger position 30.

(6) Movement of the Vibratory Noise Source:

According to the third and fourth embodiments, the ASC apparatus 10B, 10C (FIGS. 5 and 7) employs plural speakers 22a, 22b for allowing the passenger to have a sense that the engine 80 as the vibratory noise source is moving. However, the ASC apparatus may have only one speaker providing the speaker and the engine are positioned in different directions from the passenger position 30. For example, the rear speaker 22b alone is able to allow the passenger to sense as if the engine 80 is moving.

The speakers 22a, 22b may be positioned in lateral sides of the vehicle, as well as in front and rear sides of the vehicle.

Although certain preferred embodiments of the present invention have been shown and described in detail, it should be understood that various changes and modifications may be made therein without departing from the scope of the appended claims.

What is claimed is:

1. An active sound control apparatus for generating a sound effect based on a vibratory noise source signal representative of information of a running state of a vehicle or an operating state of an engine, comprising:
   an output unit for outputting a frequency component of the sound effect in response to the vibratory noise source signal;
   an output unit for outputting an amplitude component of the sound effect in response to a change per unit time in the vibratory noise source signal;
   a multiplier for outputting the sound effect by multiplying the frequency component by the amplitude component; and
   a delay circuit for adding a delay to the frequency component of the sound effect,
   wherein the active sound control apparatus outputs the sound effect having a delayed frequency component with respect to the amplitude component.

2. An active sound control apparatus for generating a sound effect based on a vibratory noise source signal representative of information of a running state of a vehicle or an operating state of an engine, comprising:
   an output unit for outputting a frequency component of the sound effect in response to the vibratory noise source signal;
   an output unit for outputting an amplitude component of the sound effect in response to a change per unit time in the vibratory noise source signal;
   a multiplier for outputting the sound effect by multiplying the frequency component by the amplitude component; and
   a delay circuit for adding a delay to the amplitude component of the sound effect,
   wherein the active sound control apparatus outputs the sound effect having a delayed amplitude component with respect to the frequency component.

3. An active sound control apparatus for generating a sound effect based on a vibratory noise source signal representative of information of a running state of a vehicle or an operating state of an engine, comprising:
   a delay circuit configured to add a delay to an engine rotation frequency signal; and
   a multiplier configured to multiply a reference signal by a gain, the reference signal being sine-wave harmonics based on the delayed engine rotation frequency signal, the gain being determined based on a change per unit time in an engine rotation frequency, thereby outputting a sound effect having a delay on a frequency component of the sound effect.

4. The active sound control apparatus of claim 3 further comprising:
   a detecting circuit configured to detect an engine rotation frequency from engine pulses generated by an engine, the engine rotation frequency signal representing the engine rotation frequency;
   a reference signal generating circuit configured to generate the reference signal based on the delayed engine rotation frequency signal;
   an engine rotation frequency change calculating circuit configured to calculate an engine rotation frequency change signal which represents the change per unit time in the engine rotation frequency based on the engine rotation frequency signal; and
   a gain determining circuit configured to determine the gain based on the engine rotation frequency change signal.

5. An active sound control apparatus for generating a sound effect based on a vibratory noise source signal representative of information of a running state of a vehicle or an operating state of an engine, comprising:
   a delay circuit configured to add a delay to a change per unit time in an engine rotation frequency; and
   a multiplier configured to multiply a reference signal by a gain, the reference signal being sine-wave harmonics based on an engine rotation frequency signal, the gain being determined based on the delayed change per unit time in an engine rotation frequency, thereby outputting a sound effect having a delay on an amplitude component of the sound effect.

6. The active sound control apparatus of claim 5 further comprising:
   a detecting circuit configured to detect an engine rotation frequency from engine pulses generated by an engine, the engine rotation frequency signal representing the engine rotation frequency;
   a reference signal generating circuit configured to generate the reference signal based on the engine rotation frequency signal;
   an engine rotation frequency change calculating circuit configured to calculate an engine rotation frequency change signal which represents the delayed change per unit time in the engine rotation frequency based on the engine rotation frequency signal; and
   a gain determining circuit configured to determine the gain based on the engine rotation frequency change signal.

* * * * *